United States Patent [19]

Stubben

[11] 4,165,072

[45] Aug. 21, 1979

[54] METHOD OF OPERATING A VIDEO GAME

[75] Inventor: David R. Stubben, Santa Clara, Calif.

[73] Assignee: Atari, Inc., Sunnyvale, Calif.

[21] Appl. No.: 862,338

[22] Filed: Dec. 20, 1977

[51] Int. Cl.² ............................................. A63F 9/00
[52] U.S. Cl. ........................... 273/85 G; 273/DIG. 28
[58] Field of Search .................. 273/1 E, 85 G, 101.2, 273/DIG. 28

[56] References Cited

U.S. PATENT DOCUMENTS

| 4,026,555 | 5/1977 | Kirschner et al. ............... 273/85 G |
| 4,112,422 | 9/1978 | Mayer et al. ............... 273/DIG. 28 |
| 4,116,444 | 9/1978 | Mayer et al. ............... 273/DIG. 28 |

Primary Examiner—Anton O. Oechsle
Attorney, Agent, or Firm—Townsend and Townsend

[57] ABSTRACT

A method of operating a video game where a full screen memory map is utilized in conjunction with a microprocessor unit which operates on a clock cycle basis where during one portion of a clock cycle video data is latched into a shift register and during the other part of the clock cycle other necessary game functions are performed by the MPU, and during the entire clock cycle video data is shifted at the horizontal scan rate from the shift register to the display screen.

5 Claims, 3 Drawing Figures

METHOD OF OPERATING A VIDEO GAME

BACKGROUND OF THE INVENTION

The present invention is directed to a method of operating a video game and more specifically to a method having a particular memory architecture using a microprocessor unit (MPU).

One type of video game uses what is termed a full memory map where in a random access memory there is a storage location or element for every possible resolution element on the video display screen. Thus a typical memory of this type might contain 61,240 bits to provide a 256×240 matrix of resolution elements. Such a memory map technique usually uses direct memory access (DMA) for the RAM memory which as defined in the "Microcomputer Dictionary and Guide" by Sippl and Kidd, First Edition 1976, published by Matrix Publishers of Champaign, Ill., as a procedure or method designed to gain direct access to main storage to thereby achieve data transfer without involving the CPU. However, the CPU must be periodically disabled while DMA is in progress thus reducing throughput. In other words, a cycle steal is occurring inhibiting the CPU operation during the direct memory access. In summary, the cycle steal DMA slows the program greatly. There must be many RAM accesses to refresh the cathode ray tube or display screen of the video game. Cycle steal is, of course, usually accomplished by the use of a "halt" input which halts microprocessor access.

One technique of remedying some of the above throughput disadvantages is shown by the prior art of FIG. 1 where instead of a full screen memory map a graphics programmable read only memory (PROM) 10 contains video data which will form the playfield of the video game which is read out on the line 11 which is connected to the video circuits. Addressing this graphics PROM is a playfield random access memory 12 which is in essence an address register for addressing the proper portion of the graphics PROM. This is controlled by an address bus 13 which is connected to RAM 12 by a multiplexer 14. Although the circuit of FIG. 1 provides improved throughput for the microprocessor unit it also requires separate motion circuits 16 to provide the moving portions of the video game.

Furthermore, in conjunction with FIG. 1 although the circuit is the type of direct memory access where in one phase of the access cycle the RAM 12 is addressed and next the data is read out of the PROM under the control of the sync allowing the microprocessor to perform other functions, the circuit of FIG. 1 still requires the separate graphics PROM and motion circuits in addition to the playfield RAM 12.

OBJECTS AND SUMMARY OF THE INVENTION

It is, therefore an object of the present invention to provide an improved method of operating a video game.

It is a more specific object to provide a method which has improved throughput but still minimizes required hardware.

In accordance with the above objects there is provided a method of operating a video game having a video display screen with a plurality of resolution elements scanned at a predetermined rate by television sync signals and a microprocessor unit. A full screen random access memory has a storage location for every resolution element of the video display screen. During a first time period, under the control of the television sync signal the video data is accessed from the random access memory and such data is stored in serial format. During a second time period, by the use of the microprocessor unit, the random access memory and other necessary game functions are updated. The stored data is read out to the display screen at a predetermined scan rate during both time periods. Thereafter the first time period step is repeated for additional video data.

DETAILED DESCRIPTION OF THE PREFERRED EMBODIMENT

Figure 1:
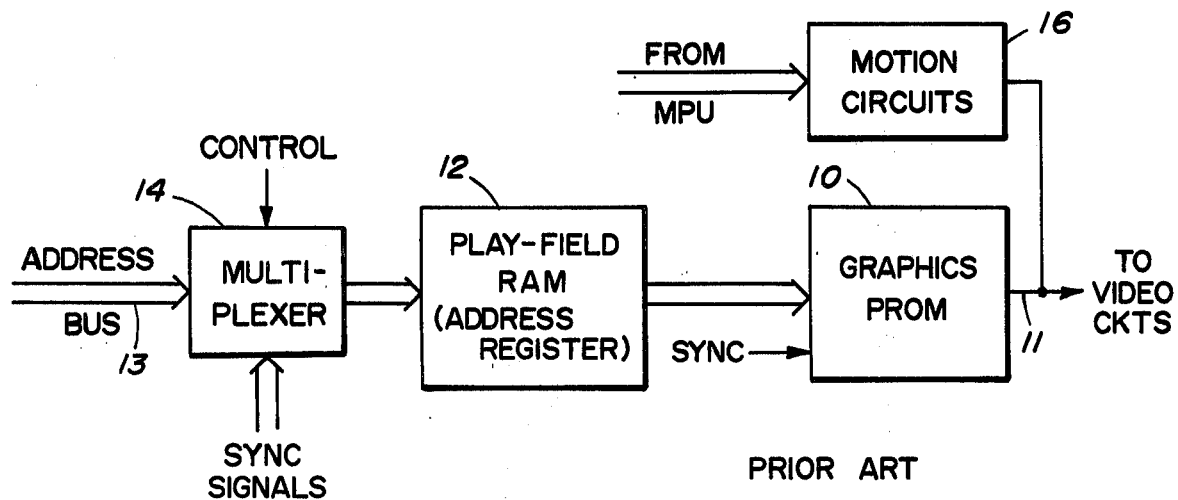
FIG. 1 is a block diagram illustrating a prior art technique.
Figure 2:
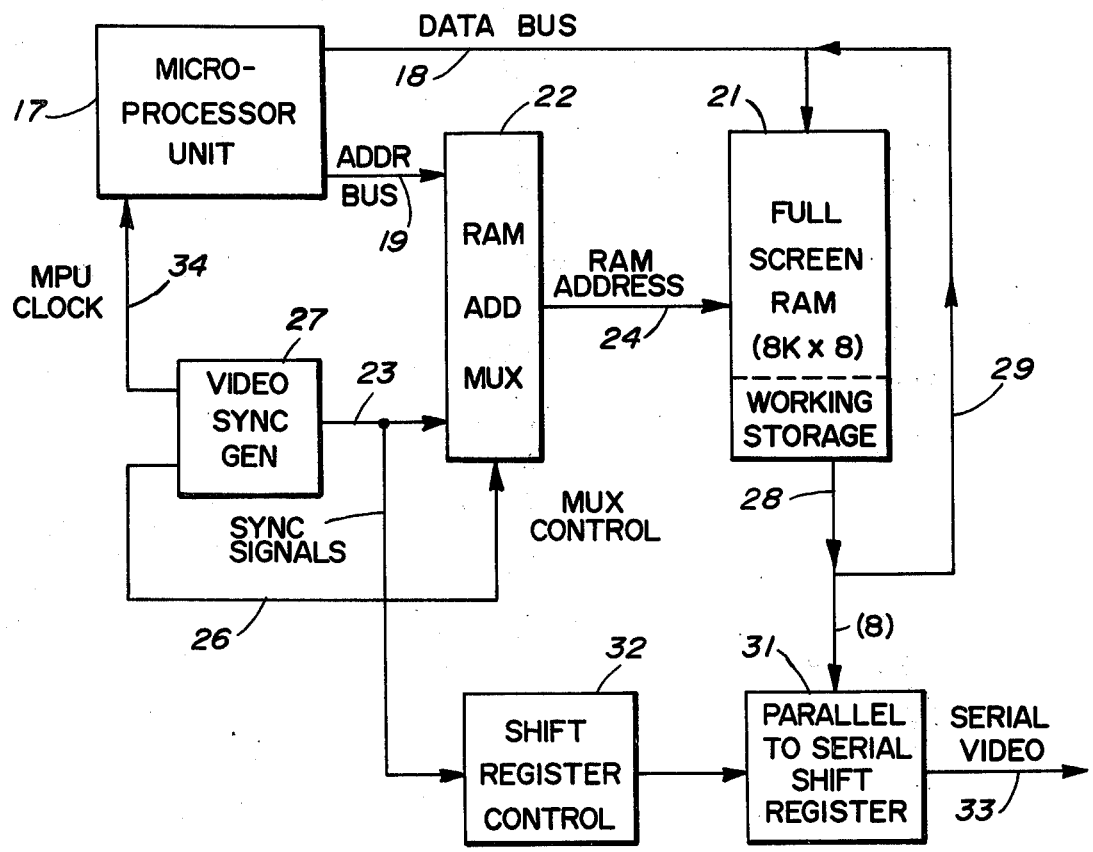
FIG. 2 is a block diagram embodying the method of the present invention.

Referring to FIG. 2, a microprocessor unit (MPU) 17 has as outputs a data bus 18 and an address bus 19. The data bus 18 is connected to a full screen random access memory 21 which is 8 K by 8 bits. Two hundred fifty six by 240 of these bits are used for the video display screen and the remainder for working storage. Such working storage would involve use, for example, as the base page and stack page RAM of the MPU 17.

A RAM address multiplexer 22 multiplexes between an address bus 19 and sync signals line 23 to a RAM address bus 24 which is connected to full screen RAM 21. The control of the multiplexer 22 is provided by line 26 which is driven by a video sync generator 27 which also provides the sync signals to line 23. Finally the video sync generator 27 on line 34 generates the MPU clock. Such MPU clock has a phase lead relative to the identical signal on line 26 to compensate for time delay in the MPU 26.

The video data output of full screen RAM 21 occurs on an eight bit byte basis on line 28 which is eight parallel lines and thus transfers this data in parallel to the latching type shift register 31. This data is also fed back on line 29 to the MPU data bus 18. Each byte memory location of RAM 21 corresponds to a portion of the video display screen. Thus a sequential readout of bytes provides a full screen image.

Under the control of shift register control unit 32, which is timed by the sync signal on line 23, the eight video data bit contents of the shift register 31 are serially shifted out to the video display screen on the serial video line 33.

The timing-flow-chart digarams of FIGS. 3A through 3E illustrate the operation of FIG. 2. FIGS. 3A and 3E show the MPU clock which has a frequency of 750 kHz. Each half cycle of the clock is therefore 660 ns. During a first time period indicated in FIG. 3E as the "Video Access" time and as described in FIG. 3D the video sync signals access eight bits or a byte of video data from RAM 21. This is shifted at the end of this time period in parallel to the shift register 31, effectively stored in serial format, and latched. Thus, as will be apparent later the continuing operation of the shift register providing a serial string of video data bits to the display screen is not interfered with. Next during the second time period indicated in FIG. 3E as "MPU Access" the MPU uses the address bus for updating stack and base page functions which provide, for example, for storage and changing variables, and other necessary game functions.

At the same time, however, as shown in FIG. 3C while the microprocessor unit is operating independently the eight bits of video data are being shifted out from shift register 31 onto line 33 under the control of the synchronizing signal. This signal is illustrated in FIG. 3B at a 6 MHz rate which is equivalent to providing 256 resolution elements in the standard horizontal trace time of a video raster type display screen. As is apparent this shifting out occurs during both the first and second time periods. Thus two functions are being performed at the same time; the actual displaying of video data bits and in addition, during the MPU access time the necessary game functions. Such game functions also are performed during vertical retrace, of course.

Lastly, as shown in FIG. 3E, during the next "Video Access" period, the sync signals sequentially access a next video byte from RAM 21 and stores the data in the register 31 to again prepare for the display of the next video byte.

Figure 3:
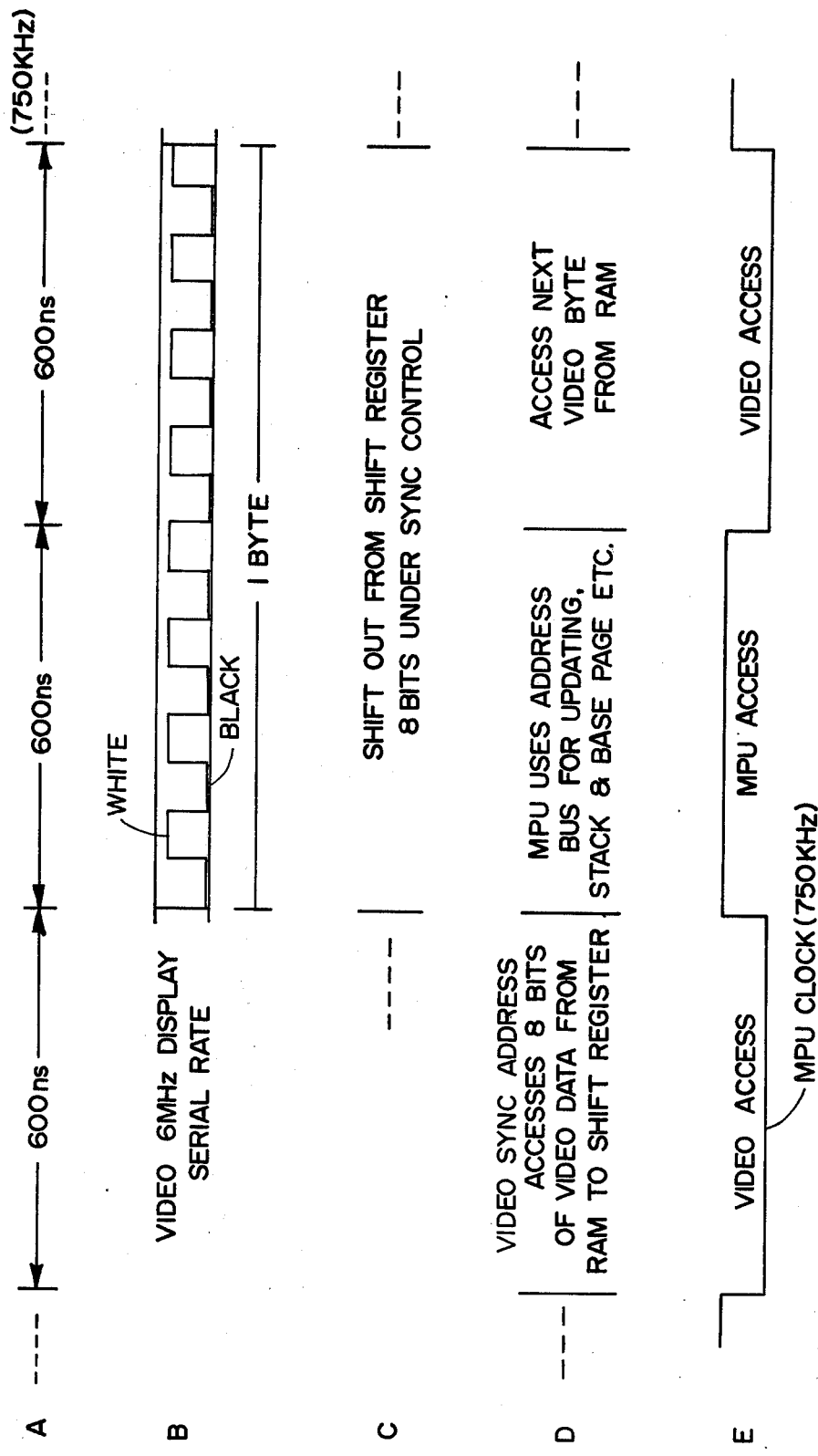
FIGS. 3A–3E is a combined timing-flow-chart type diagram useful in understanding the method of the present invention.

From examination of FIG. 3, it is apparent that the time to display one byte or eight bits of video data is necessarily related to the microprocessor unit clock. In fact, the six megahertz serial or horizontal scan rate is eight times the 750 kHz MPU clock rate and "eight" is the exact number of stored video data bits. Thus in the design of the present architecture, this relationship must be kept in mind.

The architecture of the present game is ideally suited for two levels of video (as opposed to color) since a full memory map inherently stores two level binary video data. However, by doubling the amount of RAM memory, by for example adding additional memory in parallel, four levels of video or color are possible. Tripling the RAM will give eight levels, etc.

With the foregoing method throughput is improved compared to the cycle steal DMA technique since there is a dedicated time set aside for necessary MPU game functions. Thus, the present invention has in effect combined the best aspects of simultaneous DMA and memory map game techniques.

What is claimed is:

1. A method of operating a video game having a video display screen with a plurality of resolution elements scanned at a predetermined rate by television sync signals and a microprocessor unit (MPU) and also having a full screen random access memory (RAM) having a storage location for every resolution element of said video display screen, said method comprising the following steps: during a first time period under the control of said television sync signal accessing video data from said RAM and storing such data in serial format; during a second time period performing, by use of said MPU, updating of said RAM and other necessary game functions; during both of said time periods reading out said stored data to said display screen at said predetermined scan rate; and thereafter repeating said step of said first time period for additional video data.

2. A method as in claim 1 where in said step of said first time period said data to be stored is read out in parallel at the end of said time period.

3. A method as in claim 1 where said RAM includes additional working space which is used by said MPU during said second time period.

4. A method as in claim 1 where said first and second time periods occur at a frequency which is a fraction of said scan rate determined by the number of stored video data bits.

5. A method as in claim 1 including the step of providing additional RAM memory in parallel to increase video gray scale resolution or color spectrum.

* * * * *